United States Patent [19]

Pearson et al.

[11] 4,001,144

[45] Jan. 4, 1977

[54] PROCESS FOR MODIFYING THE PORE VOLUME DISTRIBUTION OF ALUMINA BASE CATALYST SUPPORTS

[75] Inventors: Michael J. Pearson; Ronald J. Rigge, both of Pleasanton; Stephen C. Carniglia, Byron, all of Calif.

[73] Assignee: Kaiser Aluminum & Chemical Corporation, Oakland, Calif.

[22] Filed: Dec. 19, 1975

[21] Appl. No.: 642,275

[52] U.S. Cl. .............................. 252/463; 423/631
[51] Int. Cl.² ........................................ B01J 21/04
[58] Field of Search ................... 252/463; 423/631

[56] References Cited

UNITED STATES PATENTS

| | | | |
|---|---|---|---|
| 3,226,191 | 12/1965 | Osment et al. | 252/463 X |
| 3,264,061 | 8/1966 | Kehl et al. | 252/463 X |
| 3,322,494 | 5/1967 | Magee et al. | 252/463 X |
| 3,325,247 | 6/1967 | Magee et al. | 252/463 X |

*Primary Examiner*—W. J. Shine
*Attorney, Agent, or Firm*—Paul E. Calrow; Andrew E. Barlay

[57] ABSTRACT

Modification of the pore volume distribution of an alumina base catalyst support is accomplished by treating an alumina precursor of chi-rho-eta structure with an aqueous ammonium carbonate or bicarbonate solution under pressure at about 100°–160° C for 10–24 hours, followed by drying and thermal activation at a temperature of at least about 500° C. The resulting support will possess more than about 70% of its total pore volume in the 45–300 angstrom unit pore diameter range. This pore volume distribution renders it particularly suitable for use as a catalyst carrier for hydrodesulfurization purposes.

8 Claims, 4 Drawing Figures

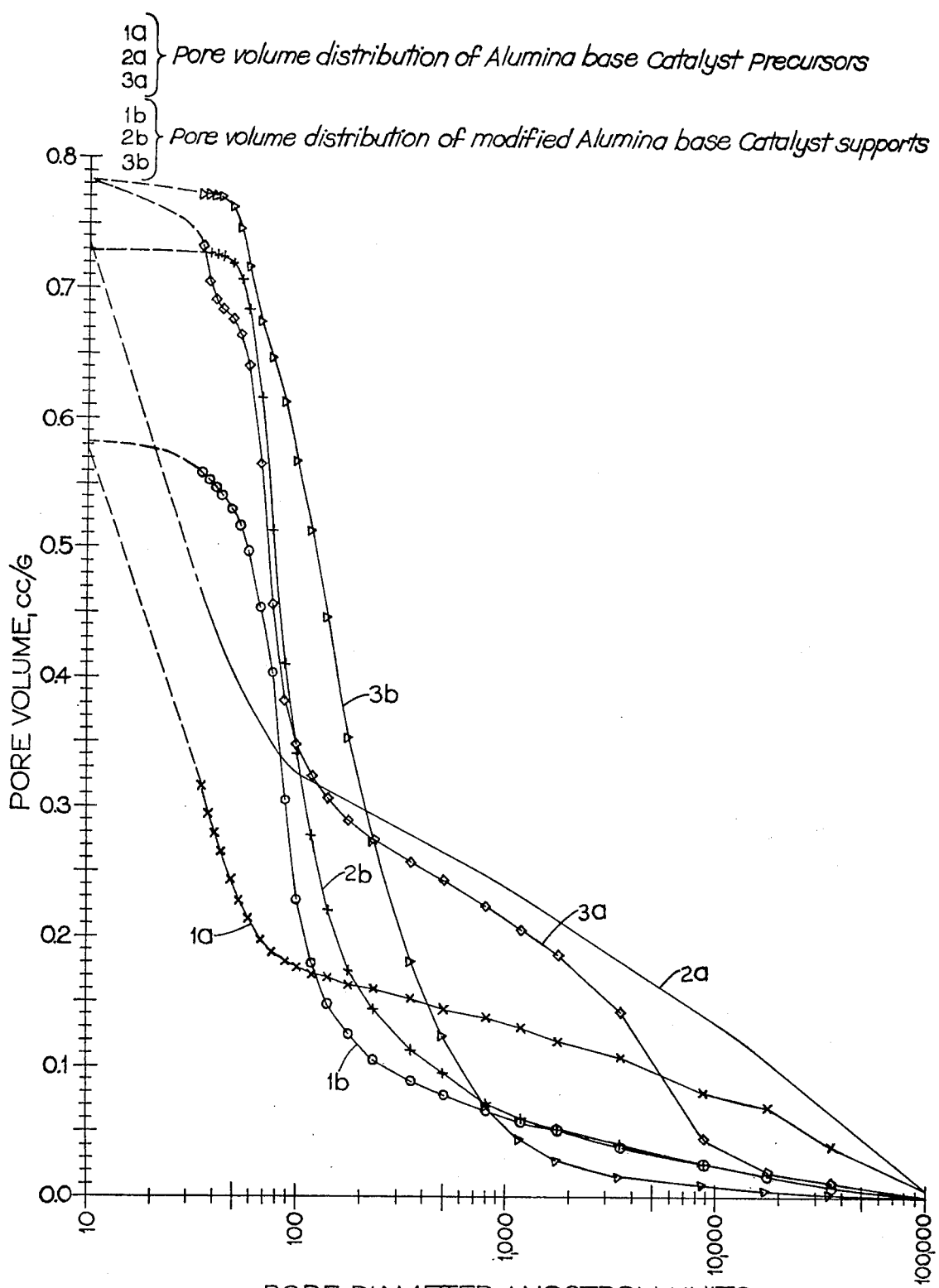
Fig-1. PORE VOLUME DISTRIBUTION OF CATALYST SUBSTRATES

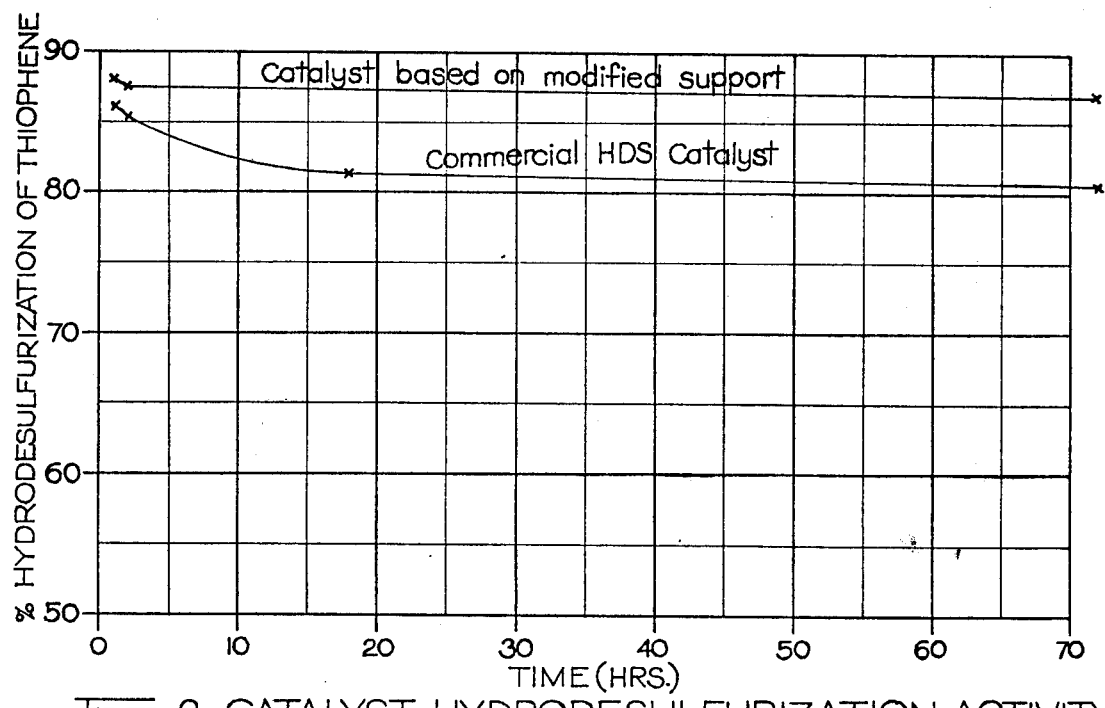
Fig-2. CATALYST HYDRODESULFURIZATION ACTIVITY

PROCESS FOR MODIFYING THE PORE VOLUME DISTRIBUTION OF ALUMINA BASE CATALYST SUPPORTS

BACKGROUND OF THE INVENTION

Catalytic hydrodesulfurization of sulfur-containing petroleum hydrocarbons is well known in the art. Generally, for desulfurization, an alumina base catalyst support is used with cobalt, molybdenum and/or nickel added as the catalytically active agents. The hydrodesulfurization reaction involves conversion of the sulfur molecules of the petroleum hydrocarbons to easily removable compounds, such as $H_2S$, and this conversion takes place on the active surface of the catalyst. Sulfur-containing petroleum hydrocarbons in many instances also contain heavy metals which during the hydrodesulfurization process, hereinafter referred to as "HDS process", tend to interfere with the efficiency of the catalyst employed. To overcome the effect of the heavy metals, the use of a two-stage system has been recommended, wherein in the first step, the heavy metals are removed by using a catalyst possessing a high macroporosity; and in the second stage, the demetallized hydrocarbons are subjected to hydrodesulfurization using an active desulfurization catalyst.

To overcome the difficulties associated with this dual system, U.S. Pat. No. 3,898,155 recommends the use of a single catalytic system employing a catalyst composition comprising an alumina base support in combination with a Group VI-B metal and at least one Group VIII metal. The catalyst composition is characterized by an average pore diameter greater than 100 angstrom units, a pore volume wherein 10–40% of the total pore volume is in macropores and 60–90% of the total pore volume is in micropores. According to this patent, this catalyst composition is capable of accomplishing simultaneous demetallization and hydrodesulfurization due to the specific pore volume distribution and pore diameter range. In U.S. Pat. No. 3,907,668 an alumina base catalyst composition containing molybdenum, cobalt and/or nickel is described for the HDS process, which is characterized by a pore volume of at least 0.5 cc/g, a surface area of at least 150 m²/g and an average pore radius of 45 to 75 angstrom units. At least 65% of the pore volume of the catalyst is in pores having a radius in the range of 50–300 angstrom units.

These prior art patents not only indicate the need of a catalyst composition which can be readily employed in the HDS process, preferably in a one-stage demetallization and hydrodesulfurization process, but also the preferred properties, such as pore diameters in a certain range and pore volumes predominantly in the micro and/or intermediate pore size range.

U.S. Pat. No. 3,907,668 also describes a method of making the alumina base for the HDS catalyst. The method involves the careful calcination of an alumina containing 0–50% by weight bayerite, generally at 427°–871° C (800°–1600° F), followed by impregnation with the catalytic agents. Subsequent to impregnation, the composite is dried, then calcined again at 427°–871° C. This composite is then ready for use for the hydrodesulfurization of petroleum distillates.

Although the results in the above patent indicate a superiority of the described catalyst composition over prior art catalyst compositions, the utilization of bayerite in the precursor of the alumina support imparts certain detrimental effects upon calcination of the precursor. It is known that bayerite, which is a beta alumina trihydrate, converts to the eta alumina form upon calcination at temperatures in excess of about 300° C; and conversion of eta alumina to a more stable theta phase alumina occurs only at temperatures in excess of about 860° C. Eta phase alumina is known to age and exhibits reduced activity, particularly when the catalyst composition is exposed to high temperatures during use or regeneration. Loss of catalytic activity in hydrodesulfurization is indicated by loss of sulfur conversion capacity. In addition, it is also known that the internal porosity of crystalline bayerite is relatively low and when it is used in a catalyst support, its presence can reduce the overall pore volume of the support. These two properties can limit the use of catalyst supports containing eta phase alumina generated by calcination of the bayerite-containing catalyst support precursor.

For catalytic applications, including hydrodesulfurization, alumina supports are preferred which possess stability in combination with high pore volume. This combination insures high catalytic activity, coupled with long service life.

A catalyst support which exhibits thermal stability under extended use at high temperatures is described in U.S. Pat. No. 3,928,236 to Rigge et al. The catalyst support, forming the subject matter of the co-pending application, is prepared by treating alumina shapes having a crystalline phase structure selected from the group consisting essentially of chi-rho-eta, pseudo-boehmite and mixtures thereof, with an aqueous ammonium salt solution having a pH within the range of 4–9. Suitable salts disclosed include ammonium acetate, bicarbonate, carbonate, chloride, formate, nitrate and sulfate. The treated shapes are then subjected to a pressure treatment for several hours at 100°–250° C, followed by a water-leach of the pressure treated shapes. Drying of the shapes, followed by calcination in the range of 500°–980° C, produces a thermally stable catalyst substrate. This substrate is suitable for use in many applications; however, when employed as a catalyst support for the HDS process its pore volume distribution does not provide the presently desired, narrow range, particularly in the micro and/or intermediate pore diameter range desired for simultaneous demetallization and hydrodesulfurization.

It has now been unexpectedly discovered that a catalyst support, exhibiting the desired pore volume distribution and preferred pore diameter range for the HDS process can be made by treating an alumina precursor, such as employed in U.S. Pat. No. 3,928,236, with an aqueous solution of ammonium carbonate and/or ammonium bicarbonate, followed by a pressure treatment at a temperature not exceeding about 160° C. The treated alumina is then optionally leached with water, followed by drying and a thermal activation treatment in the range of about 550° and 700° C. The aforedescribed process results in an alumina catalyst support which has a total pore volume in excess of about 0.50 cc/g, wherein at least about 70% of the total pore volume is represented by pores having a pore diameter in the range of about 45–300 angstrom units. This support, when combined with molybdenum, cobalt and/or nickel salts, forms an effective and stable HDS catalyst capable of converting to $H_2S$ in excess of about 80% by weight of the sulfur content of middle and heavy petroleum fractions for extended periods without losing activity.

SUMMARY OF THE INVENTION

An alumina base catalyst support having a controlled pore volume distribution, wherein at least about 70% of the total pore volume is represented by pores having a pore diameter in the range of about 45–300 angstrom units, is made for use as a support for hydrodesulfurization catalysts. When combined with molybdenum, cobalt and/or nickel salts, it is capable of converting to $H_2S$ in excess of about 80% by weight of the sulfur content of heavy and middle petroleum fractions for extended periods without losing activity. The support is made by treating an alumina base precursor selected from the group consisting essentially of alumina having a chi-rho-eta structure, with an aqueous ammonium carbonate and/or bicarbonate solution, followed by a pressure treatment at about 100°–160° C. The alumina base material is then dried and thermally activated at a temperature in the range of about 550°–700° C. The activated support exhibits a total pore volume in excess of about 0.50 cc/gm, a surface area in excess of about 150 $m^2$/g and high stability at elevated temperature use.

BRIEF DESCRIPTION OF THE FIGURES

FIG. 1 shows the relationship between total pore volume and pore diameter distribution for modified catalyst supports of the present invention in comparison to unmodified supports.

FIG. 2 depicts the hydrodesulfurization efficiency of a catalyst made from the modified support in terms of conversion of the sulfur content of thiophene to $H_2S$ in comparison to a commercial hydrodesulfurization catalyst.

DETAILED DESCRIPTION OF THE INVENTION

Figure 3A:
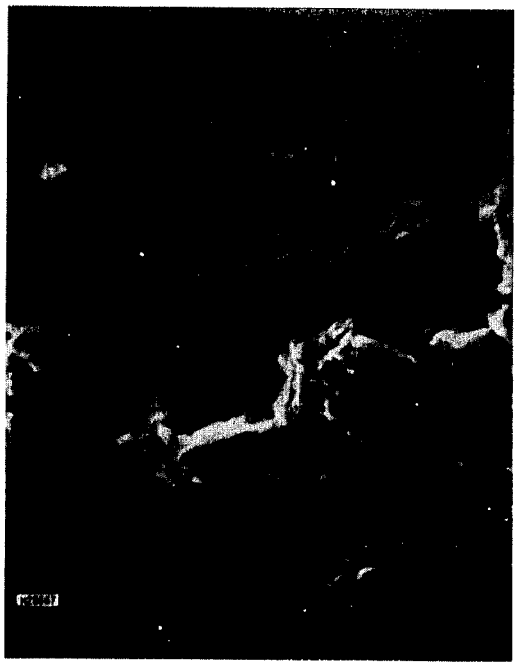
FIG. 3 shows photomicrographs of the structures of an unmodified support (3a) and a support subjected to the instant pore volume distribution modification treatment (3b).

The present invention relates to a process for making an alumina base catalyst support having a modified pore volume distribution and a unique morphology which renders it suitable for use as a support for hydrodesulfurization catalysts.

The alumina base catalyst support of the instant invention is prepared by the modification of an alumina base precursor. The alumina base precursor to be modified according to the novel process is suitably an alumina having a chi-rho-eta crystalline structure. Aluminas having a chi-rho-eta structure are well known in the art and are made by rapid calcination of gibbsite ($Al_2O_3 \cdot 3H_2O$).

For the purposes of the present invention, under the term "chi-rho-eta alumina" an alumina material is understood which has a predominantly chi-rho-eta crystalline structure, as determined by X-ray diffraction analysis, that is, the chi-rho-eta component of the alumina is in excess of 50% by weight of the alumina material.

The chi-rho-eta alumina precursor in granular form typically exhibits a total pore volume of about 0.5–0.7 cc/g and the pore volume of the micro and intermediate pores is generally about 0.40–0.45 cc/g. Shaped chi-rho-eta aluminas, such as spheres, have a total pore volume of 0.45–0.65 cc/g due to the shaping, however, the pore volume in the micro and intermediate pore diameter range is generally similar, in the range of 0.4–0.45 cc/g. The pore diameter distribution of these materials, particularly in the 45–300 angstrom unit range, is usually unsatisfactory from an HDS catalyst point of view.

It can be seen that chi-rho-eta alumina does not exhibit the desired high pore volume in the 45–300 angstrom unit range, which has been found to provide an efficient catalyst base for HDS purposes.

It has now been unexpectedly discovered that the pore volume distribution of chi-rho-eta alumina can be preferentially shifted so that more than 70% of the total pore volume will be represented by pores having a pore diameter in the desirable 45–300 angstrom unit range.

To obtain the preferred pore volume, the alumina precursor, in granular or shaped form, is treated with an aqueous ammonium carbonate and/or ammonium bicarbonate solution. The treatment consists, for example, of immersing the alumina precursor in the aqueous ammonium carbonate and/or ammonium bicarbonate solution for a time sufficient to obtain complete saturation of the pores with the treating solution. It has been found that the treating solution should have an ammonium carbonate or bicarbonate concentration in excess of about 5% by weight, preferably in the range of about 15–25% by weight. At these concentrations rapid filling of the pores of the precursor can be expected. Concentrations below about 5% by weight, although usable, provide lesser degrees of impregnation. Higher than the indicated concentrations can also be used, however, they do not accelerate impregnation and do not improve the treatment. It has been found that treatment times of less that about 5 hours suffice to accomplish complete impregnation of the pores of the alumina precursor with the treating solution.

The treatment of the precursors with the ammonium carbonate or bicarbonate solution can also proceed simultaneously with the presure treatment step of the instant invention. Thus, instead of separately treating the precursor with the ammonium carbonate or bicarbonate solution, followed by the pressure treatment step, these two stages of the instant invention can be suitably combined. In this manner of operation, the precursor is placed in a pressure-treatment vessel, such as an autoclave, together with the treating solution, impregnation and pressure treatment are then simultaneously accomplished.

Pressure-treatment of the alumina precursor is done in a suitable sealed vessel at a temperature in the range of about 100° and 160° C. Temperatures below about 100° C do not provide the desired pore volume shift, while temperatures above about 160° C instead of shifting the pore volume distribution to the desired 45–300 angstrom unit pore diameter range cause the formation of pores having pore diameters substantially in excess of 300 angstrom units and thus render the support unsuitable for HDS catalyst purposes.

The pressure treatment usually takes between about 10–24 hours depending on the temperatures selected within the above indicated temperature range. Again, shorter time periods than 10 hours do not accomplish the desired pore volume shift, longer time periods, although not detrimental, do not provide any particular advantage over the longest time period indicated hereinabove.

Subsequent to the pressure treatment, the treated alumina is allowed to drain, then traces of the treating solution may be washed off the alumina, usually with distilled or deionized water. The temperture of the wash water can vary between 20° and 100° C; wash water temperatures in the range of 25°–96° C are preferred. This washing is, however, optional.

The alumina is then dried, generally at temperatures in excess of about 100° and up to about 200° C, usually in the range of about 110° and 140° C for about 1–24 hours. The dried alumina is then thermally activated. Activation of the alumina should be accomplished at temperatures of at least about 500° C, preferably at temperatures in the range of about 550° and 700° C. The upper temperature for thermal activation can be increased beyond the recommended 700° C, but in order to retain without changes the newly imparted pore volume modification, it is advisable to accomplish the activation in the preferred range, that is, not in excess of about 700° C. The activated alumina is then ready to be combined, for example, by impregnation, with the catalytic agents, such as salts of molybdenum, cobalt and/or nickel, to form an HDS catalyst of excellent hydrodesulfurization capability.

Treatment of the chi-rho-eta precursor with ammonium carbonate and/or bicarbonate under pressure, followed by the drying and thermal activation steps converts the eta component of the precursor to a more stable crystalline form. The new crystalline form generated by the aforesaid treatments from eta phase alumina can be defined as pseudogamma-type alumina which at elevated application temperatures, such as generally employed in the HDS process, exhibit higher stability than aluminas having an eta phase.

For some HDS applications, a catalyst support having a total pore volume in excess of 0.70 cc/g, preferably in the 0.75–0.80 cc/g range is preferred, particularly if a significant fraction of the total pore volume is represented by pores having a pore diameter in the 45–300 angstrom unit range. It has been found that the precursors of the instant process can provide such high total porosity, when they are, prior to the ammonium carbonate and pressure treatment, combined with a cellulosic or other combustible material, for example, with high purity cellulose fibers. The fibers and the precursor are formed into suitable agglomerates which are then subjected to a thermal treatment, for example, at a temperature in excess of the combustion temperature of the fibers, usually in the range of about 400° and 700° C. This thermal treatment removes the organic content of the agglomerates and provides a precursor of significantly increased total porosity. The treated precursor, however, will not have the desired pore volume distribution and to obtain the high porosity in the desired 45–300 angstrom unit pore diameter range, such precursors must be subjected to the novel treatment steps of the instant process as described hereinbefore.

The instant pore volume distribution modification process which involves a treatment with ammonium carbonate or bicarbonate combined with a pressure treatment, imparts a unique morphology to the alumina precursor. This unique morphology provides internal porosity to the precursor in the 45–300 angstrom unit pore diameter range, which becomes available to the catalytic substance, e.g., cobalt, molybdenum and/or nickel and to the petroluem hydrocarbons to be hydrodesulfurized. The internal porosity provided by the novel treatment allows the hydrocarbons to extend their contact time with the catalyst and consequently, the degree of hydrodesulfurization can be significantly improved in comparison to catalysts which only possess the usual type of porosity.

Figure 3B:
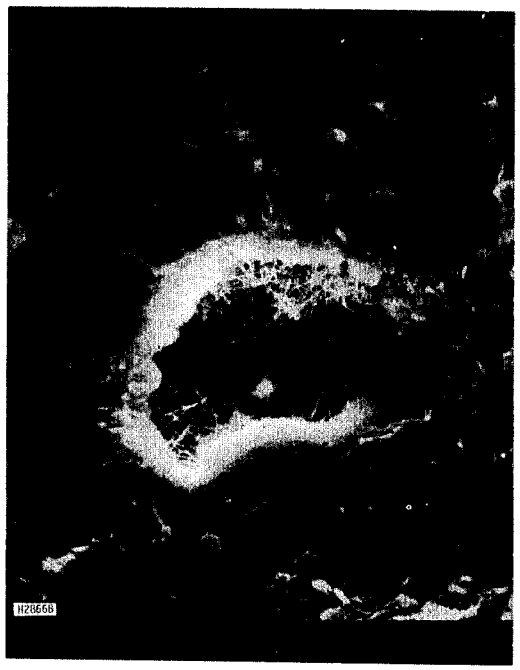

FIG. 3b clearly shows the effect on the alumina precursor structure imparted by the novel treatment in comparison to FIG. 3a which depicts an untreated alumina. It can be observed that high internal porosity is created which is indicated by the formation of needle-like shapes within the inside of the treated precursor. These needle-like shapes impart the advantageous properties desired from efficient hydrodesulfurization catalyst carriers.

To further illustrate the novel aspects of the instant invention, the following examples are provided.

EXAMPLE I

Spherical alumina, having a predominantly chi-rho-eta structure (more than about 60% by weight), was subjected to the pore volume distribution modification process of the instant invention. The alumina possessed a total pore volume of 0.58 cc/g of which 0.11 cc/g was represented by pores having a pore diameter in the 45–300 angstrom unit range. The surface area of the alumina was 327 m$^2$/g. In a zircalloy autoclave 250 g of the alumina spheres were placed together with 250 ml 20% aqueous $NH_4HCO_3$ solution. The autoclave was then sealed and heated at 140° C for 18 hours. After cooling the spheres were removed, the excess treating liquid was then drained off the spheres and the wet spheres were dried overnight at 110° C. Thermal activation of the spheres was accomplished at 600° C for 2 hours. The resultant modified alumina exhibited a pore volume of 0.44 cc/g within the 35–300 angstrom unit pore diameter range which corresponds to about 76% of the total pore volume of the treated material. The surface area of the treated spheres was 191 m$^2$/g. The pore volume distributions of the modified alumina and of the precursor alumina after identical calcination, but without the novel treatment are shown in FIG. 1 wherein curve 1a indicates the unmodified precursor and curve 1b shows the modified alumina. These curves clearly indicate the significant shift in pore volume distribution imparted by the novel treatment.

EXAMPLE II

A zircalloy autoclave was charged with 250 g of alumina agglomerates made from an alumina of predominantly chi-rho-eta structure alumina. The agglomerate contained about 75% by weight chi-rho-eta alumina and exhibited a total pore volume of 0.73 cc/g of which 0.13 cc/g represented the volume of pores in the 45–300 angstrom unit pore diameter range. To the autoclave 250 ml aqueous, 24% ammonium carbonate solution was added and then the autoclave was heated to 150° C for 18 hours. Subsequently, the autoclave was cooled, the agglomerates were removed and drained, then dried overnight at 110° C. The dried agglomerates were then thermally activated at 600° C for 2 hours. The activated agglomerates had a surface area of 200 m$^2$/g and a pore volume of 0.54 cc/g within the 45–300 angstrom unit pore diameter range, which corresponds to about 74% of the total pore volume. The pore volume distributions of the modified alumina and the identically calcined unmodified precursor alumina are shown in FIG. 1 as curves 2b and 2a, respectively.

The treatment was repeated using an autoclaving temperature of about 100° C. The resultant alumina, although improved, failed to obtain the desired pore volume distribution. Autoclaving of the same precursor at 190° C was also accomplished. In this case the modified alumina, while exhibiting improved properties, again failed to achieve the desired pore volume distribution. These tests clearly indicate the criticality of the temperature in the autoclaving step.

EXAMPLE III

Granular chi-rho-eta alumina was admixed with 14% by weight of cellulosic fiber and the mixture was formed into spheres. The spheres were then heated to above 500° C to combust the cellulose fibers. The resultant product had a surface area of 240 m$^2$/g and a total pore volume of 0.78 cc/g of which 0.42 cc/g represented the pore volume of pores in the 45–300 angstrom unit pore diameter range. From these spheres 250 g were placed in a zircalloy autoclave and 250 ml aqueous 20% ammonium bicarbonate solution was added. The autoclave was sealed and heated at 150° C for 18 hours. After cooling, the liquid was drained, the wet spheres were dried overnight at 110° C, then thermally activated at about 580°–620° C. The modified, activated spheres had a surface area of 197 m$^2$/g and a 0.57 cc/g pore volume for pores having a pore diameter in the 45–300 angstrom unit range. This corresponds to about 72% of the total porosity. The pore volume distribution of both the precursor and the modified support is shown in FIG. 1 as curves 3 a and 3 b, respectively.

EXAMPLE IV

The modified alumina support of Example 3 was impregnated with an aqueous 21.7% ammonium molybdate solution, followed by drying at about 120° C for 24 hours. The dried composite was then impregnated with 19.5% aqueous Co(NO$_3$)$_2$.6H$_2$O solution, followed by drying at about 120° C for 24 hours. The catalyst composite was then activated at about 550°–650° C for 3–5 hours. The activated catalyst containing 7.9% molybdenum and 2.9% cobalt was then tested for hydrodesulfurization efficiency by conversion of the sulfur content of thiophene. Prior to testing, the catalyst was subjected to a reducing treatment for 30 minutes at 400° C in hydrogen according to well-known practice, then the reduced catalyst was presulfided by contacting it for 1 hour at 400° C with a gas mixture of H$_2$S and H$_2$ containing 10% by volume H$_2$S. The reduced and presulfided catalyst was then contacted with a gaseous mixture of thiophene and hydrogen having a 5% by volume thiophene content. Contacting was done at a temperature of 400° C at a thiophene-hydrogen gas mixture flow rate of 25 ml/min. Conversion efficiency of the catalyst was checked by determining the quantity of H$_2$S obtained by the conversion of the bound sulfur of thiophene. The stability of the catalyst was established by conducting the thiophene conversion test for 72 hours. For comparison, a commercially available HDS catalyst was also tested. The commercial catalyst had a total pore volume of 0.59 cc/g, of which 0.51 cc/g represented pores having a pore diameter in the 45–300 angstrom unit range. The catalyst had a surface area of 239 m$^2$/g. This commerical catalyst containing 8.4% molybdenum and 2.7% cobalt was reduced and presulfided according to the above-described procedure, followed by testing of its efficiency by the hereinbefore discussed thiophene conversion test. The test conditions were the same for this commercial catalyst as for the catalyst prepared on the novel modified support. The comparative results are tabulated in the Table and are also shown in FIG. 2.

It can be observed that not only has the catalyst based on the novel, modified support, a higher thiophene conversion efficiency, but also a higher stability indicated by the present sulfur converted to H$_2$S even after a 72 hour continuous test at 400° C. The results in the Table clearly show the superiority of the catalyst made from a support modified according to the present invention in comparison to a commercial catalyst based on an unmodified support.

TABLE

| PROPERTIES | CATALYST BASED ON MODIFIED SUPPORT | COMMERCIAL CATALYST |
|---|---|---|
| Surface area m$^2$/g | 181 | 239 |
| Total pore volume cc/g | 0.67 | 0.59 |
| Pore volume for pores in 45–300 A pore diameter range cc/g | 0.47 | 0.51 |
| Thiophene conversion to H$_2$S in % | Catalyst based on Modified Support | Commercial Catalyst |
| After 1 hour - 400° C | 88.0 | 86.0 |
| After 2 hours - 400° C | 87.5 | 85.3 |
| After 72 hours - 400° C | 87.0 | 80.7 |

While the instant process has been described with regard to catalyst supports which are suitable for making hydrodesulfurization catalysts for pertroleum hydrocarbons, it will be apparent to those skilled in the art that the novel pore volume modification treatment disclosed herein results in alumina base supports which can be readily employed for purposes other than preparation of hydrodesulfurization catalyst. Consequently, the instant invention is not to be limited except as by the scope of the appended claims.

What is claimed is:

1. A process for modifying the pore volume distribution of an alumina base catalyst support precursor which comprises the steps of:
    a. treating an alumina precursor of chi-rho-eta structure with an aqueous solution of an ammonium salt selected from the group consisting essentially of ammonium carbonate, ammonium bicarbonate and mixtures thereof;
    b. subjecting the treated alumina to a pressure treatment at a temperature in the range of about 100° and 160° C for a time period of about 10 hours to 24 hours;
    c. drying of the pressure-treated alumina at a temperature in excess of about 100° and up to about 200° C for about 1–24 hours followed by thermal activation at a temperature of at least about 500° and not in excess of about 700° C; and
    d. recovering an eta-free, alumina base catalyst support of modified pore volume distribution characterized by having at least about 70% of its total pore volume in the 45–300 angstrom unit pore diameter range.

2. Process according to claim 1 wherein the treatment with the aqueous ammonium salt and the pressure treatment are accomplished simultaneously.

3. Process according to claim 1, wherein the ammonium salt is ammonium carbonate.

4. Process according to claim 1, wherein the ammonium salt is a bicarbonate.

5. A process for modifying the pore volume distribution of an alumina base catalyst support precursor which comprises the steps of:
 a. admixing an alumina base precursor of chi-rho-eta structure with a cellulose followed by preparing agglomerates from the admixture;
 b. calcining the admixture in the range of about 400° and 700° C to combust substantially all of the cellulosic material;
 c. treating the calcined agglomerates with an aqueous solution of an ammonium salt selected from the group consisting essentially of ammonium carbonate, ammonium bicarbonate and mixtures thereof;
 d. subjecting the treated agglomerates to a pressure treatment at a temperature in the range of about 100° and 160° C for a time period of about 10 hours to about 24 hours;
 e. drying of the pressure-treated agglomerates at a temperature in excess of about 100° and up to about 200° C for about 1–24 hours followed by thermal activation at a temperature of at least about 500° and not in excess of about 700° C; and
 f. recovering an eta-free alumina base catalyst support of modified pore volume distribution characterized by having at least about 70% of its total pore volume in the 45–300 angstrom unit pore diameter range.

6. Process of claim 5, wherein the treatment with the aqueous ammonium salt and the pressure treatment are accomplished simultaneously.

7. Process according to claim 5, wherein the ammonium salt is ammonium carbonate.

8. Process according to claim 5, wherein the ammonium salt is ammonium bicarbonate.

* * * * *